Patented Aug. 14, 1951

2,564,332

UNITED STATES PATENT OFFICE 2,564,332

METHOD OF MAKING SOLUBLE BEVERAGE EXTRACT

John L. Kellogg, Chicago, Ill.; Helen Louise Kellogg executrix of said John L. Kellogg, deceased No Drawing. Application May 4, 1948, Serial No. 25,098

5 Claims. (Cl. 99—71)

This invention relates to improvements in soluble beverage extracts and to an improved method of making the same.

A principal object of the invention is to provide an improved dry beverage product containing a beverage characterizing substance and a stabilizing substance, the latter of which, when the dry product is dissolved in a liquid, is thoroughly dispersed throughout the liquid and functions to keep the suspended particles in the liquid from coagulating and thereby provide a substantially permanent dispersion.

Another object of the invention is to provide a simplified method of introducing the said stabilizing substance into the product whereby it will be uniformly dispersed throughout the liquid body when the dry product is dissolved in water.

Another object of the invention is to provide a dry beverage product of the above character, including a soluble coffee extract as a beverage characterizing substance, and one or more of the following substances—skimmed milk, whole milk, cream, and vegetable oil, and to incorporate in such a product a stabilizer which functions not only as a mulsifier to keep the fatty and other particles uniformly dispersed throughout the beverage but also serves to hold the flavor and aroma principles of the beverage extract during the drying thereof.

A further object of the invention is to incorporate in a dry beverage powder of the above general class a mild sweetening substance, preferably lactose, which serves to accentuate the flavor of the coffee ingredient and also functions, when introduced as a powder into the dry beverage product, to make the beverage product free flowing, whereby the powdered product can be stored in mechanical dispensing machines with assurance that it will not adhere to the walls of the storage chamber and that a predetermined amount of the powder will be dispensed when the machine is actuated.

The coffee solubles are preferably extracted from the coffee by means of percolating water heated to approximately 200° F. through the freshly roasted and ground coffee. In this connection any approved method of percolating the water through the coffee grounds may be followed, for example, the counter-current method disclosed in United States Patent 2,282,138 in which the coffee grounds are subjected to repeated extractions, using the extract obtained by an earlier operation as the extracting vehicle in a subsequent extracting operation. Such extracts in addition to containing water soluble coffee substances, also contain small amounts of fats which collect and hold the highly volatile flavoring principles of the coffee. In some instances the fat content of the extract is increased by the addition of vegetable oil or by mixing milk or cream into the coffee extract; the larger quantity of fats serving to retain a larger portion of flavoring principles and to impart to the beverage a rich coffee and cream flavor.

The coffee extract, either with or without the added fats, is concentrated and homogenized to break up and distribute the particles of fat throughout the extract before it is dried into powder form. However, when the powder is dissolved in water to form a liquid beverage, the small particles of fat, notwithstanding the homogenization of the extract before drying, have a tendency to coagulate and float to the top of the liquid beverage. This tendency, of course, is more noticeable when the fat content of the beverage has been increased by the addition of vegetable oil, milk or cream.

The present invention overcomes the above described tendency of the particles of fat and other substances to separate from the other ingredients, by introducing into the beverage product, before the drying thereof, an emulsifying agent which functions to hold the small particles of fat and other substances including coffee oil uniformly dispersed throughout the liquid beverage.

The emulsifying agent herein used is preferably lecithin, since it is a wholesome food product and a very small percentage by weight will be sufficient to coat the minute droplets of coffee oil and other fats contained in the beverage so that these substances will remain substantially permanently dispersed in the liquid beverage.

It is important that the lecithin be thoroughly distributed throughout the liquid beverage. Otherwise, it will not function efficiently to maintain the particles of fat in uniform dispersion for long periods of time. The present invention, therefore, includes an improved method for uniformly distributing the lecithin throughout beverage extract before the drying thereof and thereby insure uniform dispersion of the lecithin in the dry powdered product and in the liquid beverage made from the powder.

The lecithin will not mix with water. Consequently it will not mix readily with a thin coffee extract. In order, therefore, to obtain a uniform distribution of the lecithin throughout the beverage product, it is first thoroughly mixed with a quantity of soluble coffee powder. The soluble powder impregnated with lecithin is then thoroughly mixed with a quantity of relatively heavy coffee extract, for example, an extract of about 30° Baumé. This mixture is then heated to approximately 140° Fahrenheit, homogenized at 2500 pounds pressure, and spray dried at high temperatures. By homogenizing this mixture at high pressure, before drying the extract, the fats are broken up into extremely small particles and the lecithin, providing a microscopic coat for the fatty particles, prevents them from coagulating, when the dried powder is dissolved, and thereby stabilize the liquid beverage.

Example No. 1

When the beverage product is produced in the above manner, the several ingredients are mixed in the following proportions:

| | Total solids, pounds |
|---|---|
| 1. 0.16 pounds of lecithin heated to 140° Fahrenheit and mixed into 5 pounds of dry coffee extract | 5.16 |
| 2. Add to the above 2 gallons of 9° Baumé liquid coffee extract containing 18% solids to make thin smooth paste | 3.00 |
| 3. Add 1½ gallons of 30° Baumé liquid coffee extract containing 60° solids | 8.20 |
| 4. Heat the above mixture to 140° Fahrenheit, homogenize the same at 2500 pounds pressure and dry in spray drier. | |
| Total | 16.36 |

The above Example No. 1 may be modified by introducing into the mixture, either before or after the drying operation, approximately 2.45 pounds of lactose which amount is equal to approximately 15%, by dry weight, of the total solids of Example No. 1. This ingredient, because of its mild sweetening effect, accentuates the coffee flavor and quickens the dissolving action of the dry powder in either hot or cold water. When the lactose is introduced into the product before the drying operation, it is dissolved in the 2 gallons of 9° Baumé coffee extract (ingredient No. 2).

When the lactose is introduced as a dry powder, it is thoroughly mixed with the dry coffee extract (Example No. 1 or any other example herein disclosed). The lactose is, preferably, in the form of a very fine powder and when added to the dry beverage extract it provides the separate particles of the extract with a lactose powder coating which reduces the hygroscopic character of the extract and makes it particularly suitable for use in mechanical dispensing machines. The powder is maintained free flowing and will not adhere to the storage chamber or the discharge ducts of the dispensing machine. The coating of lactose on the separate particles of the dried beverage product also increases the solubility of the product as a whole, since the lactose coating prevents coagulation of the less soluble particles of the beverage product, when water is added, and thereby insures thorough wetting of all particles of the beverage product.

The beverage product may be produced as a mixture of soluble coffee extract, concentrated skimmed milk fortified with a suitable vegetable oil. Concentrated whole milk and/or cream may be used as substitutes for the skimmed milk and vegetable oil or milk and cream ingredients may be blended with the skimmed milk and vegetable oil.

The following examples show certain preferred proportions of the ingredients of the beverage product when it comprises soluble coffee extract and lecithin together with concentrated skimmed milk, vegetable oil, whole milk and cream.

Example No. 2

| | Total solids, pounds |
|---|---|
| 1. 5 gallons of concentrated skimmed milk containing approximately 30% solids | 13.5 |
| 2. 1 gallon—18% butter fat and cream | 2.125 |
| 3. 3.65 hydrogenated vegetable oil | 3.65 |
| 4. 2½ gallons of coffee extract (approximately 12° Baumé) containing 24% solids | 5.0 |
| 5. 1½ gallons—30° Baumé coffee extract containing 60% solids | 7.5 |
| 6. 144 grams of lecithin being substantially 1% by weight of the dry coffee extract. | |

The lecithin will not mix with water or milk, but it will unite with the hydrogenated vegetable oil called for in the above Example No. 2. The oil and the lecithin (ingredients 3 and 6) are separately heated to approximately 140° F. and the oil is gradually added to the lecithin, this mixture being stirred during the mixing operation so as to insure uniform distribution of the lecithin throughout the entire quantity of oil. The evaporated skim milk and the cream (ingredients Nos. 1 and 2) of the quantities and weights above specified, are heated to approximately 140° F. and added slowly to the mixture of the oil and lecithin. The mixture (ingredients Nos. 1, 2, 3 and 6) thus far prepared, is now homogenized at pressures of 1,000 to 1,500 pounds pressure. The liquid coffee extract (ingredient No. 5) is heated to approximately 140° F. and added to the previous homogenized mixture. If desired, evaporated whole milk in the quantity specified may be substituted for the cream (ingredient No. 2) or the ingredient may be wholly omitted. In such case, the amount of vegetable oil should be proportionately increased so as to compensate for the fat content of the cream omitted. In any event, the vegetable oil is hydrogenated so as to prevent the fats from becoming rancid.

Example No. 3

The product, according to Example No. 3, includes the hereinafter specified ingredients in the following proportions:

| | Total solids, pounds |
|---|---|
| 1. 5 gallons of cream containing 18% butter fat (or its equivalent in evaporated whole milk) | 10.625 |
| 2. 4 gallons of 9° Baumé coffee extract containing 18% solids | 6.00 |
| 3. 9 lbs. of soluble coffee powder | 9.00 |
| 4. Lactose equal by weight to 15% of the ingredients 1, 2 and 3 | 3.8 |
| 5. 133 grams of lecithin mixed in 65 cubic centimeters of ethyl alcohol (the amount of lecithin being equal to 1% by weight of the solids). | |

In the Example No. 2, the vegetable oil serves as a carrier of the lecithin to insure uniform distribution in the skimmed milk and cream ingredients. Inasmuch as Example No. 3 does not include a vegetable oil, the lecithin is heated to 120° F. and 65 cubic centimeters of ethyl alcohol is gradually added thereto. The lecithin and alcohol is now thoroughly mixed with 2 pounds of soluble coffee powder (ingredient No.

3). The said ethyl alcohol breaks up the lecithin and serves as a liquid dispersing media which uniformly distributes the lecithin throughout the said 2 pounds of dry coffee powder. The remaining 7 pounds of coffee powder (item No. 2) is now thoroughly mixed with the lecithin impregnated coffee powder.

The above coffee powder impregnated with lecithin is now mixed in the liquid coffee extract (extract 2) and the entire mixture thus far produced is heated to approximately 140° F. and homogenized at 1500 pounds pressure. The ingredient No. 1 (18% cream) or the equivalent in the whole milk is new heated to approximately 140° F. and the homogenized coffee, lecithin and alcohol is mixed therewith and the total mixture is homogenized at 2,500 pounds pressure and spray dried.

The lactose in Example No. 3 performs the same function as in Example No. 1 and may be introduced into the product either before the last mentioned homogenized or after the product has been dried.

*Example No. 4*

|  | Total solids, pounds |
|---|---|
| 1. 5 gallons of cream containing 18% butter fat | 10.625 |
| 2. 1.535 pounds hydrogenated vegetable oil (Cyrol) | 1.535 |
| 3. 2 gallons 12° Baumé coffee extract | 4.000 |
| 4. 7¾ pounds soluble coffee powder | 7.750 |
| 5. 15% lactose | 3.485 |
| 6. 108 grams of lecithin equal to 1% by weight of the other solids. |  |

The vegetable oil of the above example is preferably heated to approximately 130° F. and added slowly to the lecithin and heated to the same temperature. The cream (ingredient 1) is heated to 130° F. and the vegetable oil and lecithin is slowly added thereto, the cream being stirred during the mixing operation so as to insure thorough distribution of the lecithin and oil throughout the cream. This mixture is then homogenized at 130° F. and 1,000 pounds pressure. The soluble coffee powder (ingredient 5) and the coffee extract (ingredient 4) are now mixed and added to the cream and oil mixture. The entire mixture is now heated to approximately 140° F. and homogenized at 2,500 pounds pressure and spray dried.

I claim:

1. The process of producing a dry beverage product comprising soluble coffee extract and a small quantity of lecithin, which process includes mixing a small quantity of lecithin with a quantity of dry coffee extract, adding to this mixture of dry coffee extract and lecithin a quantity of liquid coffee extract and stirring the same to form a thin smooth paste, adding to the thin paste material a heavy liquid coffee extract, heating the mixture to 140° Fahrenheit and drying the homogenized material.

2. The process of producing a dry beverage product comprising soluble coffee extract and a small quantity of lecithin, which process includes the ingredients mixed in the following proportions: 0.16 pound of lecithin heated to 140° Fahrenheit and mixed into approximately 5 pounds of dry coffee extract, adding to this mixture 2 gallons of 9° Baumé liquid coffee extract containing 18% solids and stirring the same to form a thin smooth paste, then adding to the mixture 1½ gallons of 30° Baumé liquid coffee extract containing 60% solids, heating the mixture to 140° Fahrenheit and homogenizing the same at 2500 pounds pressure and thereafter drying the homogenized mixture.

3. The process of producing a dry beverage product containing soluble coffee extract, dried milk solids and hydrogenated vegetable oil, and a small quantity of lecithin, which process comprises mixing the lecithin ingredient with the vegetable oil at temperatures of 130° to 140° Fahrenheit stirring the lecithin and vegetable oil mixture into a quantity of liquid coffee extract of approximately 12° Baumé, heating skimmed milk concentrated and containing 30% solids, to 140° Fahrenheit and mixing the same with the mixture of vegetable oil, lecithin and coffee extract and homogenizing this mixture, thereafter adding a quantity of 30° Baumé coffee extract to the mixture, heating the mixture to 140° Fahrenheit and thereafter homogenizing the mixture at 2500 pounds pressure and spray drying the same.

4. The process of providing a dry beverage product containing soluble coffee extract, dried milk solids, including butter fat, and a quantity of lecithin in the following proportions, which process includes mixing 133 grams of lecithin in 65 cubic centimeters of ethyl alcohol at temperature of 120° Fahrenheit, mixing the said lecithin and alcohol mixture with approximately 2 pounds of soluble coffee extract and thereafter mixing the mixture thus provided with 7 pounds of dry coffee extract so as to uniformly distribute the lecithin throughout the entire body of extract, mixing 5 gallons of cream containing 18% butter fat with 4 gallons of 9° Baumé coffee extract containing 18% solids, adding the cream and coffee extract mixture to the mixture of dry coffee extract and lecithin, homogenizing the mixture at 2500 pounds pressure and spray drying the same.

5. A process of producing a dry beverage product according to claim 9 in which a quantity of dry lactose powder is intermixed with the spray dried mixture to provide a lactose powder cooling for the separate particles of the spray dried mixture.

JOHN L. KELLOGG.

REFERENCES CITED

The following references are of record in the file of this patent:

UNITED STATES PATENTS

| Number | Name | Date |
|---|---|---|
| 1,367,715 | Pratt et al. | Feb. 8, 1921 |
| 1,381,821 | Greenberg | June 14, 1921 |
| 1,660,541 | Bollman | Feb. 28, 1928 |
| 1,877,641 | Bolton et al. | Sept. 13, 1932 |
| 2,350,903 | Kellogg | June 6, 1944 |